March 24, 1936. L. DUFOUR 2,035,150
AGRICULTURAL TRACTOR
Filed June 21, 1934 6 Sheets-Sheet 1

March 24, 1936. L. DUFOUR 2,035,150
AGRICULTURAL TRACTOR
Filed June 21, 1934 6 Sheets-Sheet 3

March 24, 1936.  L. DUFOUR  2,035,150

AGRICULTURAL TRACTOR

Filed June 21, 1934  6 Sheets-Sheet 4

L. Dufour
INVENTOR

By Marks & Clerk
Attys.

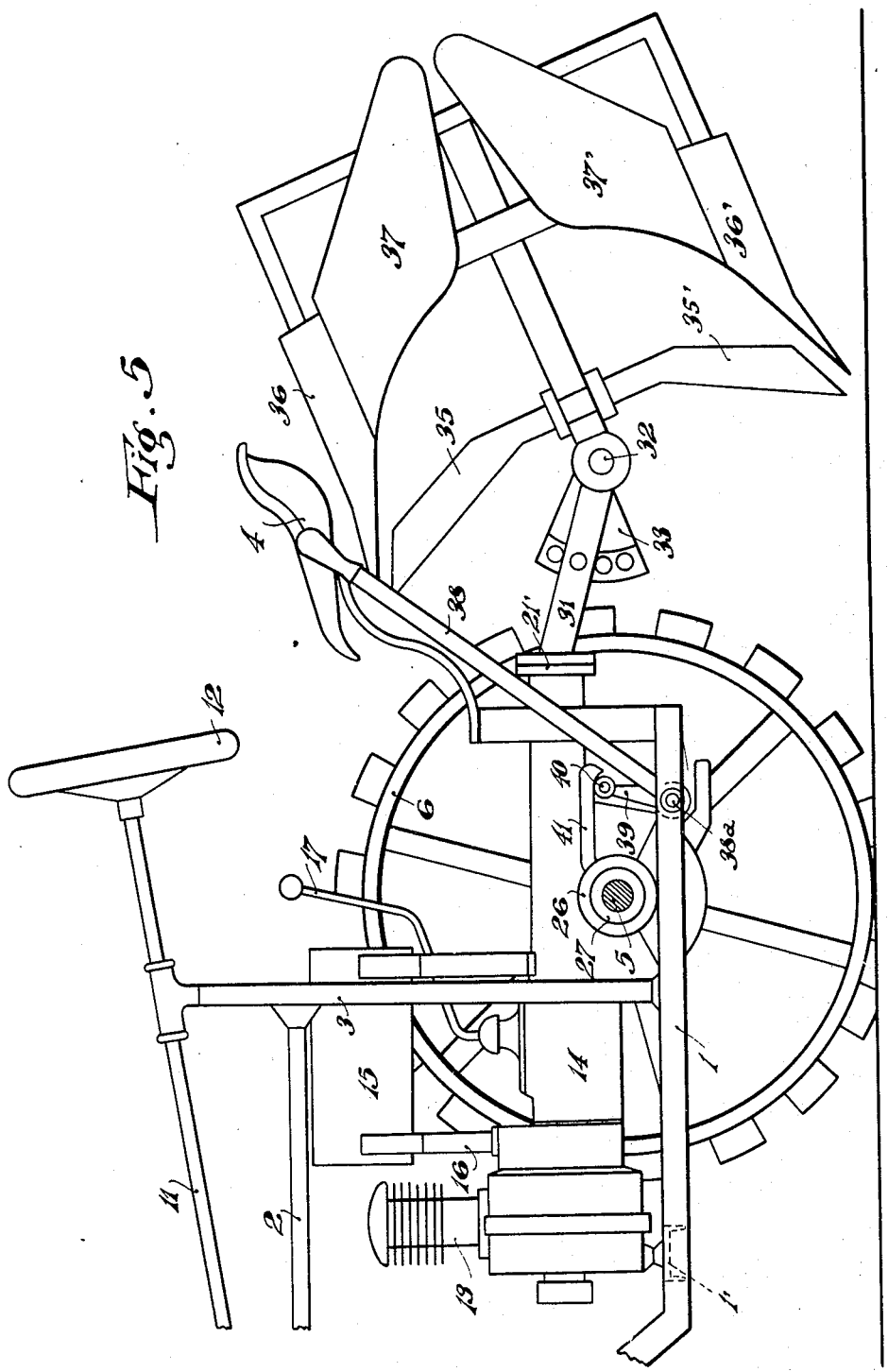

March 24, 1936.　　　L. DUFOUR　　　2,035,150
AGRICULTURAL TRACTOR
Filed June 21, 1934　　　6 Sheets-Sheet 6
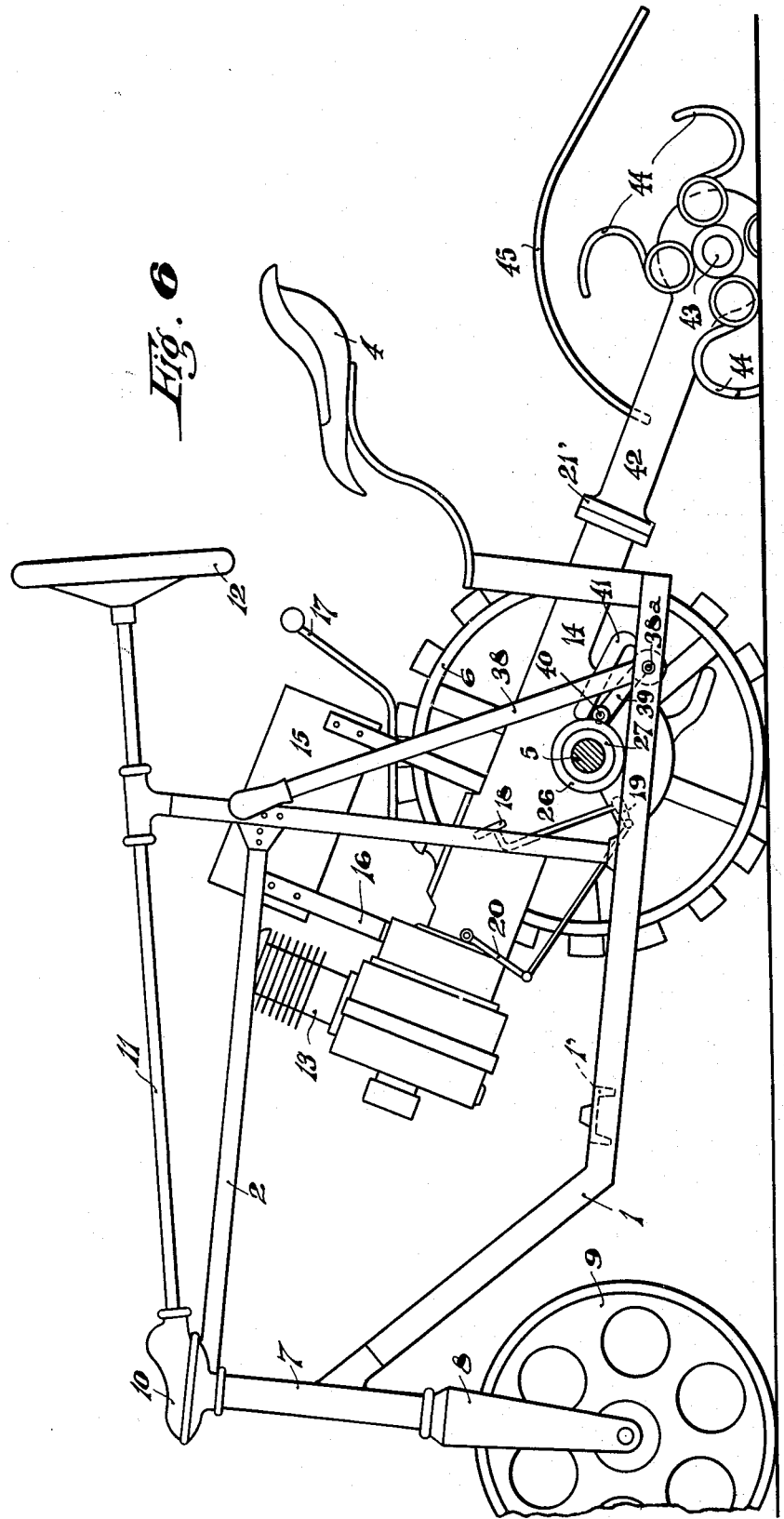

Patented Mar. 24, 1936

2,035,150

UNITED STATES PATENT OFFICE 2,035,150

AGRICULTURAL TRACTOR

Léon Dufour, Versoix, Switzerland

Application June 21, 1934, Serial No. 731,744
In Switzerland June 24, 1933

6 Claims. (Cl. 97—47)

This invention relates to agricultural tractors.

It is a known fact that when an agricultural tractor is moving and pulling a load, the driving couple applied to the traction wheels of the tractor produces an opposed reaction upon the body of the tractor, which reaction tends to rear the front part of the tractor and to make it tilt about the axis of the traction wheels in the direction opposite to the rotation of the wheels. The effect of this reaction on the body of the tractor is particularly felt in light tractors, and it has already caused many accidents owing to rearing of the tractor and its complete turning over.

The present invention has as its principal object the provision of an agricultural tractor which completely avoids the above inconvenience.

The invention consists in a tractor comprising two distinct parts which are hingedly connected one to the other by the axle of the driving wheels or by a shaft extending parallel to and in proximity of the driving axle. One of these two parts, which will be called the relatively stationary part, comprises the frame or chassis of the tractor supporting the seat of the driver in the rear of the driving axle, the steering gear, and one or two front guide wheels the weight of which must be sufficient to balance the weight of the driver and to make these wheels bear on the ground with a sufficient weight to enable proper steering of the tractor. The other part of the tractor, which will be called the relatively movable part, comprises the driving motor or prime mover with all its accessories such as fuel and oil reservoirs, radiator or air cooling ventilator, the gear box containing the change speed gear, reverse drive mechanism, and the usual differential gear used in tractors.

The driving axle and the tractive wheels themselves can be considered as belonging either to the relatively stationary or to the relatively movable part when the rotatable connection of these two parts is obtained by the driving axle. The movable part carries at its rear end the hook or coupling member for attaching the load which is to be pulled by the tractor.

In a tractor, which is built in the above described manner, the rearing reaction balancing the driving couple applied to the traction wheels can act only on the movable part of the tractor. This reaction can thus raise the hingedly mounted motor and gear box and tend to tilt them backwards about the driving axle, while no effect whatsoever is exerted by this reaction on the relatively stationary part formed by the frame, the seat of the driver and the guide wheels. The security of operation, moving and steering of such a tractor is therefore complete even if the tractor as a whole is of relatively light weight.

A further object of the invention is the provision of a tractor comprising simplified means which are easy to operate and cheap to manufacture, for raising the agricultural implements such as plows, rotatable cutters, or others, which are directly attached to the rear of the tractor, above the soil into inoperative position when the tractor is moving to and from a field, on a road.

Several constructional embodiments of a tractor according to the invention are illustrated in the accompanying drawings, in which, Figure 1 is a side elevation of a tractor according to the invention, in the position of rest, the relatively fixed part and the relatively movable part of the tractor being hingedly connected one with another by means of the axle of the driving wheels.

Figure 5 shows the same tractor and plow in position of rest.

Figure 6 is a side view of a tractor of the type shown in Figs. 1 and 2 provided with a tilling tool which receives its movement from the motor shaft of the tractor.

In all the shown side elevations, one of the driving wheels of the tractor is supposed to have been taken away for clearness' sake.

Figure 1:
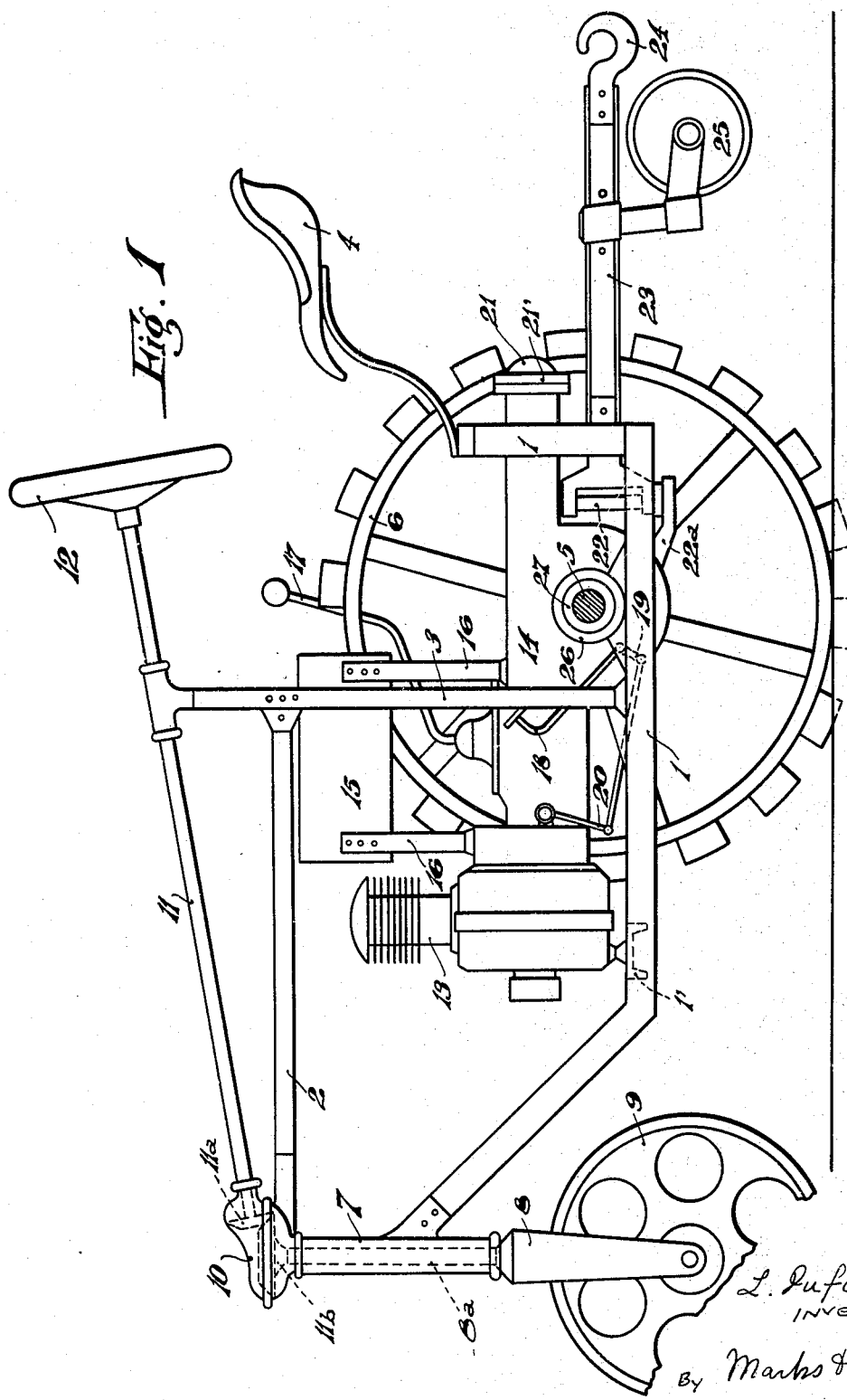
Figure 2:
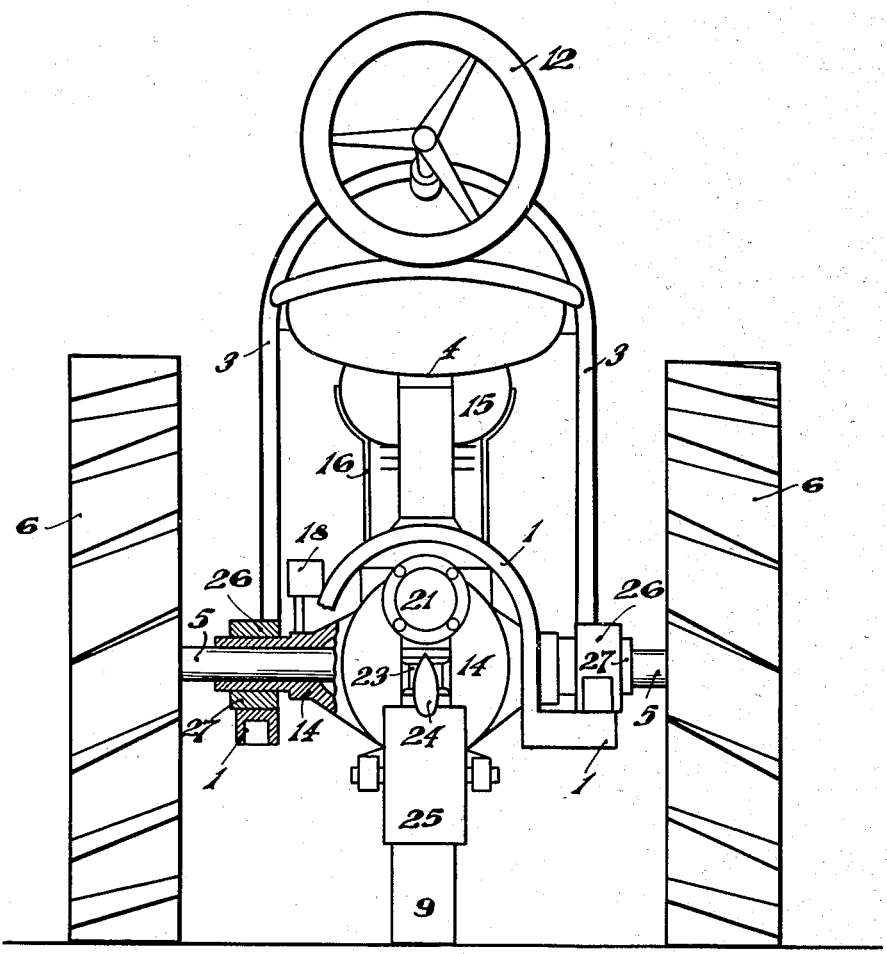
Figure 2 is a rear view of this tractor.

The tractor according to Figs. 1 and 2 comprises a relatively stationary part constituted by a frame work 1, 2, and 3. The frame member 1 carries at its rear end the seat 4 for the driver. This seat is situated at the rear of the axle 5 of the driving wheels 6. The fore end of the frame comprises a hollow vertical post 7 forming a bearing for the shaft 8a of the fork 8 supporting the guide wheel 9.

Steering of the tractor is effected by means of the steering wheel 12 fixed at one end of the shaft 11 the other end of which carries a bevel wheel 11a meshing with a bevel wheel 11b carried by the shaft 8a. The two wheels 11a and 11b are enclosed in a box 10. The steering shaft 11 is rotatably carried by the frame member 3. The guide wheel 9, its supporting fork and the bearing post 7 must be relatively heavy to counterbalance the weight of the driver on the seat 4 and to provide for sufficient extra weight acting on the wheel 9 to make it adhere to the soil and enable its function as guide wheel.

The movable part of the tractor comprises the motor 13 and the gear box 14 which contains the clutch, the change speed gear, the gear wheels transmitting movement to the driving axle, and the differential gear. All these parts are well known and are the same as in ordinary tractors and have therefore not been represented in the figures. A gasoline tank 15 is carried above the gear box 14 by means of brackets 16, and an ordinary gear shift lever 17 is provided for throwing in the different speeds and reverse drive. A clutch pedal 18 is rotatably mounted on a pin 19 carried by the gear box to operate the clutch control lever 20. The rear end of the gear box is closed by a cover 21 screwed to a flange 21'. A pin 22 is removably carried by a bracket 22a fixed to the gear box 14 and serves for connection of a draught beam 23 ending in a hook 24. A roller 25 supports the draught beam.

The relatively stationary frame member 1 of the tractor carries two bearings 26 in which are journalled two sleeves 27 rigid with the gear box 14, while the sleeves 27 act themselves as bearings for the driving axle 5. Thus the relatively movable part of the tractor, that is the motor, the gear box and the draught beam, is rotatably carried by the stationary frame and can turn about the axis of the driving wheels.

When the tractor is in the position of rest, as shown in Figs. 1 and 2, the motor 13 and the gear box 14, which are much heavier in front of the axle 5 than the draught beam behind the axle, are supported on a transverse beam 1' extending between the two longitudinal beams 1 of the frame. But when the tractor is in operation and pulls a load, the reaction which ordinarily would tend to rear up the tractor, can act only on the movable part; the gear box 14 swings about the axle 5 and the motor 13 is lifted and abandons the transverse beam 1', eventually until the roller 25 abuts against the soil, but this reaction has no effect whatsoever on the relatively stationary part of the tractor. Particularly the guide wheel 9 will always bear on the soil with the same adhering weight, independently of the amount of rearing reaction and the tractor will never turn over. It will be seen in Figure 2 that the motor and the gear box 14 are relatively narrow. When the driver is seated on the seat 4 he will extend his legs on either side of the gear and place his feet on the bearings 26 and 27. Any movement of the relatively movable tractor part will therefore not disturb the driver.

Figure 3:
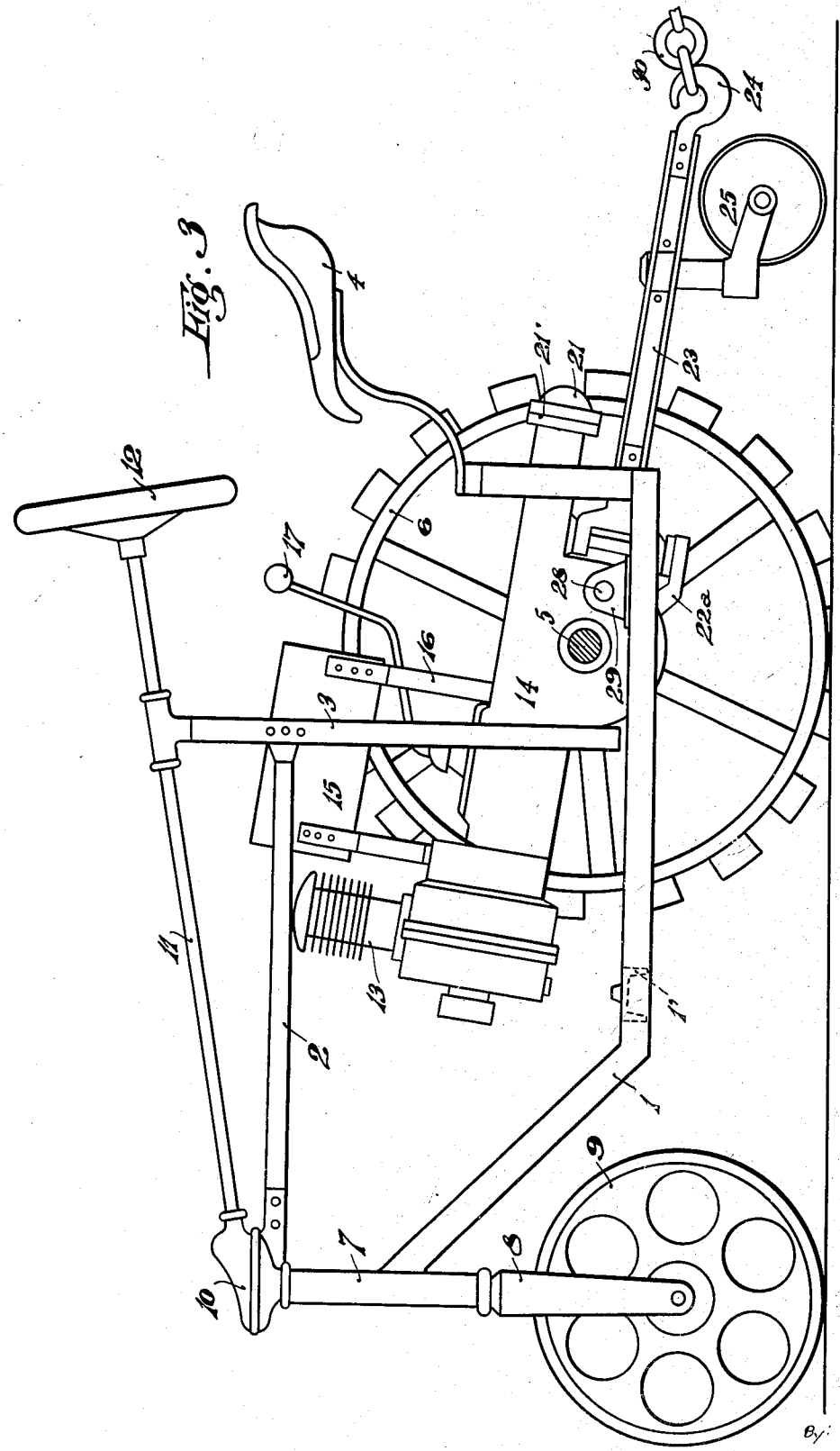
Figure 3 is a side view of a modified tractor in position of operation while pulling a load; the relatively movable part and the relatively fixed part of the tractor being hingedly connected by means of an axis extending in parallel direction adjacent to the driving axle.

Figure 3 shows a tractor in position of operation and pulling a load by means of a chain 30. In this figure the same reference numerals as in Figs. 1 and 2 indicate like parts. The represented tractor however comprises a modification as to the manner of connection of the movable and stationary parts.

The gear box 14 is provided with a pair of aligned journal pins 28 the axis of which extends parallel to the axle 5. The pins 28 are supported in bearings 29 carried by the fixed frame members 1. The hinged connection of the relatively stationary and movable tractor parts is thus obtained by means of an axis extending parallel to and in close proximity of the driving axle 5. It is seen in Fig. 3 that the rearing reaction acting on the movable part of the tractor has raised the motor 13 which is not resting any more on the transverse beam 1'. The roller 25 is near the soil but not yet abutting against it, since it has been supposed that the traction exerted by the chain 30 balances the rearing reaction of the movable part of the tractor. It will be understood that owing to the rotatable connection 28—29 (or 26—27 in Figs. 1 and 2), no rearing effort will be transmitted to the front wheel 9 which remains fully stable, as well as the seat 4 of the driver which will only slightly be lowered in the tractor according to Fig. 3.

According to the tractive effort and to the angle under which acts the chain 30, the roller 25 can bear against the soil. In this case, the vertical force applying the roller upon the soil, which force is however not very considerable, would have to be deducted from the force of adherence of the traction wheels 6.

Figure 4:
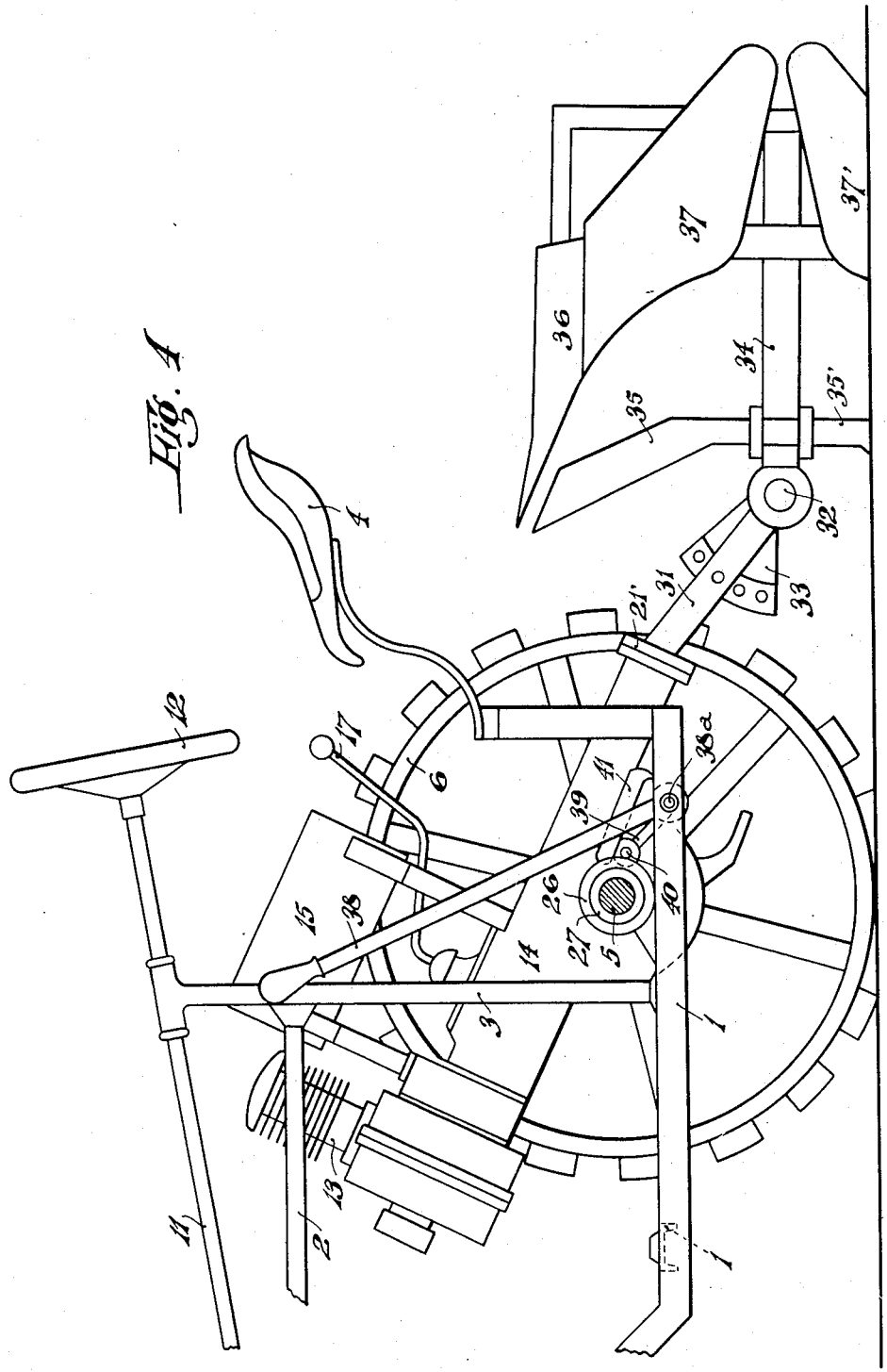
Figure 4 is a side view of a tractor of the type shown in Figs. 1 and 2 and pulling a reversible plow in position of operation.

Figure 4 shows by way of example a tractor of the type represented in Figs. 1 and 2 and carrying at its rear end a reversible plow in position of operation. The same reference numerals indicate like parts in Figs. 1 and 4. The cover 21 which, in Fig. 1, is screwed on the flange 21' has been removed and replaced by an arm 31 also screwed to this same flange 21'. The arm 31 supports a pivot pin 32 carrying the plow beam 34 the inclination of which can be adjusted by means of a regulating sector 33. The plow comprises, like any reversible plow, two colters 35 and 35', two shares 36 and 36' and two mold boards 37 and 37'. In the position represented in Fig. 4 the colter 35', the shares 36' and the mold board are shown as being engaged in the soil in working position. The regulating sector 33 and the pivot 32 permit to vary the depth of work, since the beam 34 of the plow must remain horizontal while working, and the plow with the movable part of the tractor can swing together about the driving axle 5.

When the driver arrives at one end of the field which he is plowing and desires to turn back, he will raise the plow by turning the entire structure, formed by the movable part of the tractor and by the plow about the axis 5. For effecting this rotation, a lever 38 is provided, which is rotatably mounted on the frame member 1 at 38a and is rigid with a short lever arm 39 carrying a roller 40 bearing against a path 41 provided on the gear box 14. When pulling on the lever 38, the arm 39 acts on the gear box by the intermediary of the roller 40 and makes the box and the plow turn about the axle 5, into the position of rest shown in Fig. 5, in which the motor is resting again on the transverse beam 1' of the frame. Since in this position the roller 40 has passed slightly beyond its dead point, the stability of the raised position is assured.

In certain particular cases, in order to bring the force of adherence of the traction wheels to its maximum, it may be advantageous to fix the movable part of the tractor, in its position of rest according to Fig. 1, by means of a raising mechanism described later on with reference to Figs. 4 and 5, and to renounce for these particular cases the advantage of the absolute stability of the guide wheel 9.

It will also be seen in Fig. 3 that the hook 24 for attaching the load is situated relatively near to the soil which feature is very advantageous in many cases. This situation of the hook close to the ground has been rendered possible only owing to the rotatable connection of the two parts of the tractor and to the tilting movement of the relatively movable part. When the hook 24 (or the roller 25), encounters an obstacle or a swelling of the soil, it can raise by making the front portion of the movable part of the tractor tilt downwardly, to pass over the obstacle.

A further important advantage of the tractor according to the invention is obtained when a motor driven soil cultivating tool is used which will be rigidly connected to the flange 21' of the gear box 14. When such a tool has a weight so as to approximately balance the weight of the motor relative to the driving axle 5, the tool can easily be driven into the soil or the grass when in position of operation, or raised above the soil to be placed in position of rest when the tractor advances on a road or changes its direction when working a field, by a simple tilting movement of the movable part of the tractor about its axis of rotation.

Any other system of locking the movable part of the tractor could however be used. In case the plow would be too heavy to be raised by hand by means of the lever 38, in spite of the counterweight formed by the motor, for example when much soil is clogging on the plow, the driver would need only to throw in reverse drive and to slowly engage the clutch. In this case, the rearing reaction, acting in opposite direction owing to reverse drive, will instantly raise the plow and bring it into position of rest, even before the tractor wheels start to turn backwards. In order to move the plow into operating position, the driver pushes the lever 38 back into the position shown in Figure 4, and as the weight of the plow is slightly higher than the weight of the motor, the plow falls down on the soil and will dig itself into the soil as soon as the tractor is started.

Figure 6 represents a tractor of the same type as shown in Figures 1 and 2, and which is provided with a tool which is driven by the motor of the tractor. The represented tool is a rotatable tilling cutter the use of which is well known in motor driven agricultural implements. A hollow arm 42 is screwed to the flange 21' of the gear box 14. This arm contains a shaft which will be coupled with a shaft contained in the gear box and extending for this purpose into proximity of the flange 21'. The shaft extending within the hollow arm 42 drives the shaft 43 of the tilling cutter by the intermediary of a pair of not represented bevel wheels, while the shaft 43 itself carries the rotatable cutters 44 which are diagrammatically represented.

A protective cover 45 extends above the tilling cutter. The raising of the cutter into position of rest when the tractor is moving on a road, or for turning when working in a field, can be obtained by means of a lever 38, 39, a roller 40 and path 41 as had been described relative to Figs. 4 and 5.

It will be understood that in the place of a rotatable tilling cutter, other implements can be attached to the flange 21' of the movable part of the tractor, such as for example a mower, a potato digger, a rotatable disk plow, a field winch, or any other apparatus for cultivating the soil and which must be pulled along a field while simultaneously actuated by a motor and which must either work while being engaged in the soil, or must be raised above the soil when not in operation. A tractor according to the invention has therefore not only the advantage of complete stability and security of operation, but realizes the additional advantage that it can be provided on its rear end with cultivators which are either stationary like a plow or motor operated, and of which the two positions of operation and of rest, either engaged in the soil or raised above the soil are obtained owing to the hinged connection between the relatively stationary part and the relatively movable part of the tractor.

The invention permits thus to replace in a simple manner the complicated, heavy and expensive mechanisms used heretofore for raising the agricultural implements attached to the rear end of a tractor, into inoperative position.

I claim:—

1. An agricultural tractor comprising a relatively stationary part and a relatively movable part connected to each other for relative pivotal movement about a transverse axis, a prime mover carried by said relatively movable part and situated in front of said transverse axis, a draught beam carried by said relatively movable part at the rear of said transverse axis, the weight of that portion of the relatively movable part together with the prime mover situated in front of the transverse axis being considerably heavier than the weight of the portion thereof situated at the rear of the transverse axis together with the draught beam, and a transverse beam carried by the relatively fixed part for supporting the front end of the relatively movable part.

2. An agricultural tractor comprising a pair of traction wheels, a driving axle therefore, a frame work carried by the axle, a transverse axis carried by said frame work and extending parallel and in close proximity to said driving axle, a relatively movable part pivotally mounted on said transverse axis, a prime mover carried on said part and situated in front of said transverse axis, a draught beam connected to said pivoted part at a point in the rear of the transverse axis, the weight of that portion of the pivoted part situated in front of the transverse axis together with the prime mover being considerably heavier than the portion of this part situated at the rear of the transverse axis together with the draught beam, and a transverse beam carried by said frame work for supporting the front end of the relatively movable part.

3. An agricultural tractor comprising a relatively stationary part and a relatively movable part connected to each other for relative pivotal movement about a transverse axis, a prime mover carried by said relatively movable part and situated in front of said transverse axis, coupling means on said relatively movable part for detachably securing an agricultural implement thereto at a point situated at the rear of said transverse axis, and self locking tilting means interposed between said relatively stationary part and the rear end of said relatively movable part, and operative to lift said rear end upon an agricultural implement being secured thereto for raising the implement above the soil and to rigidly connect said relatively movable and stationary parts.

4. An agricultural tractor such as defined in claim 3 wherein said means for tilting the movable tractor part comprise a lever rotatably mounted on the relatively stationary tractor part, a roller carried by said lever, and a guide path rigid with the movable tractor part and acted upon by said roller upon a movement of rotation of said lever, this movement being assisted, if necessary, by throwing the motor of the tractor into reverse gear.

5. A motor operated agricultural tractor comprising a relatively stationary part and a relatively movable part connected to each other for relative pivotal movement about a transverse axis, a motor carried by said relatively movable part and situated in front of said transverse axis, a draught beam carried by said relatively movable part at the rear of said transverse axis, the weight of that portion of the relatively movable part together with the motor situated in front of the transverse axis being considerably heavier than the portion thereof situated at the rear of the transverse axis together with the draught beam, means on the relatively stationary part for supporting the front end of the relatively movable part, a seat for the driver carried by the relatively stationary part at the rear end thereof, and a guide wheel supporting the front end of said relatively stationary part.

6. A motor operated agricultural tractor comprising a relatively stationary part and a relatively movable part connected to each other for relative pivotal movement about a transverse axis, a motor carried by said relatively movable part and situated in front of said transverse axis, a draught beam carried by said relatively movable part at the rear of said transverse axis, the weight of that portion of the relatively movable part together with the motor situated in front of the transverse axis being considerably heavier than the weight of the portion thereof situated at the rear of the transverse axis together with the draught beam, a seat for the driver carried by the relatively stationary part at the rear end thereof, a guide wheel fixed to and supporting the front end of said relatively stationary part, the weight of that portion of the relatively stationary part situated in front of the transverse axis being considerably heavier than the weight of the portion thereof situated at the rear of the transverse axis, and means on the relatively stationary part for supporting the front end of the relatively movable part.

LÉON DUFOUR.